United States Patent [19]

Thomas et al.

[11] Patent Number: 4,670,236

[45] Date of Patent: Jun. 2, 1987

[54] CONTROL OF SCALE IN FLUE GAS SCRUBBERS

[75] Inventors: Peter A. Thomas, Lafayette; Doug B. Dewitt-Dick, Lake Mohawk, both of N.J.

[73] Assignee: Drew Chemical Corporation, Boonton, N.J.

[21] Appl. No.: 822,890

[22] Filed: Jan. 27, 1986

[51] Int. Cl.$^4$ ............................................. C01B 17/00
[52] U.S. Cl. ...................................... 423/242; 252/82
[58] Field of Search ......... 252/82; 423/242 A, 242 R, 423/244 A, 244 R

[56] References Cited

U.S. PATENT DOCUMENTS 3,801,699 4/1974 Arnold ................................. 423/244
4,171,292 10/1979 Jones et al. ......................... 423/244

FOREIGN PATENT DOCUMENTS 0123108 10/1984 European Pat. Off. .............. 252/82

OTHER PUBLICATIONS

Pollution Engineering, vol. 16, pp. 34–38, 1984.

Primary Examiner—Gregory A. Heller
Attorney, Agent, or Firm—Walter H. Schneider

[57] ABSTRACT

A method for minimizing calcium scale deposits in wet slurry flue gas desulfurization systems by introducing into the slurry a 50:50 diisobutylene-maleic anhydride copolymer of an average molecular weight of 11000.

2 Claims, 3 Drawing Figures

CALCIUM SULFITE/SULFATE
UNTREATED 5000x

CALCIUM SULFITE/SULFATE
TREATED WITH PMA
COPOLYMER 5000x

CONTROL OF SCALE IN FLUE GAS SCRUBBERS

BACKGROUND OF THE INVENTION

1. Field of the Invention

This invention relates to flue gas scrubbers. More particularly, this invention relates to flue gas scrubbers employed to remove sulfur dioxide from flue gases generated in utility and industrial steam generating units, incinerators and the like. Still more particularly, this invention relates to a process for controlling scale in flue gas scrubbers in which sulfur dioxide is removed from flue gases by scrubbing with an aqueous solution or slurry.

2. Description of the Prior Art

The use of sulfur-containing fuels, particularly coal, in industrial processes, such as in the generation of steam and the like, produces flue gases that cannot be discharged directly to the atmosphere because of the impact on the environment of their sulfur dioxide contents. Such flue gases, therefore, are usually subjected to any of several treating systems designed to remove, or at least reduce, their sulfur dioxide content. One such system is known as a wet scrubbing system in which the flue gas is treated, or scrubbed, with an aqueous alkaline liquor in the form of a slurry or solution to convert the sulfur dioxide content to an alkaline sulfite or sulfate salt. This salt is then removed as scrubbing liquor and is bled from the system.

When a slurry of lime (calcium oxide) or limestone (calcium carbonate) is used as the scrubbing liquor, the sulfur dioxide of the flue gas is converted to calcium sulfite and/or calcium sulfate salts. These calcium salts not only have a low solubility in the scrubbing liquor but also tend to produce highly tenacious deposits of scale in the flue gas desulfurization system (FGD) particularly on surfaces in the demister and spray section and on the packing and associated ductwork. The scale thus produced reduces system throughput by increasing the pressure drop across the system, with corresponding reduction in the efficiency of the system in removing sulfur dioxide from the flue gas. The labor and down time associated with periodically shutting the system down to manually clean the system of deposited scale is costly as is replacement of components of the system that may be damaged by the scale beyond the point of salvage.

Various procedures have been proposed for controlling calcium scale when using lime and limestone slurries in FGD systems one of which involves the use of various additives to the slurry designed to inhibit the formation of scale. U.S. Pat. No. 4,177,245, for instance, discusses the reduction of calcium scale formation by inhibiting the oxidation of calcium sulfite to the more insoluble calcium sulfate through the use of additives such as magnesium oxide (U.S. Pat. No. 3,919,393), thiosulfate (U.S. Pat. No. 3,937,788) and hydroquinone (U.S. Pat. No. 3,485,581), and further discloses in detail the use of nitric oxide for the same purpose. U.S. Pat. No. 4,216,087 discloses the use of 2-hydroxyethyl iminodiacetate for the same purpose while U.S. Pat. No. 4,284,513 discusses a procedure for inhibiting the formation calcium scale by providing a film on the surfaces of the FGD system through the use of any of various organic phosphor compounds, especially phosphonates, phosphoric acid esters and polyol phosphoric acid esters.

SUMMARY OF THE INVENTION

Notwithstanding the varying degrees of success that may accompany various prior art procedures, including those identified above, for combating the formation of calcium scale on the surfaces of calcium slurry flue gas scrubbers, there remains, nevertheless, a continued demand for improvement in this respect. It is a principal object of this invention to meet this demand. It is a further object of this invention to provide a process for minimizing the deposit of calcium sulfite and/or calcium sulfate scale on the surfaces of FGD system using aqueous calcium slurries to remove sulfur dioxide from flue gases. It is a still further object of this invention to improve the efficiency and cost effectiveness of such FGD systems by minimizing the down time and replacement costs necesitated by the formation of calcium scale.

These various objects have been met in accordance with this invention by incorporating in the aqueous calcium-bearing scrubbing liquor introduced into an FGD system a copolymer of diisobutylene and maleic anhydride. The particular 50/50 diisobutylene/maleic anhydride blend and the average molecular weight of 11,000 of the copolymer selected for this purpose are important to the performance of the invention in that the copolymer additive is believed to cause, within the environment in which the invention is practiced, a modification of the crystalline growth of the formed calcium salts, as contrasted to inhibiting the formation of the crystals. The result is a modified crystalline particle that is smaller than the crystalline particle produced in the absence of the additive and which appears to adhere much less readily to the surfaces of the FGD system. Moreover, since the transfer of the sulfur dioxide from the flue gas to the aqueous calcium-bearing slurry is an equilibrium reaction, the greater surface area provided by the modified smaller crystalline particle allows for a more efficient removal of sulfur from the flue gas. Finally, the particular copolymer has been shown to exhibit general surfactancy and dispersancy properties, both of which are important in order for it to be efficacious in the high solids level, i.e., 5-25%, of the FGD environment.

It is known from U.S. Pat. No. 2,723,956 to use copolymers of maleic anhydride and polymerizable monoethylenic compounds, e.g., diisobutylene, for the reduction and prevention of scale in steam boilers caused by the presence of calcium carbonate. U.S. Pat. No. 4,126,549 also makes reference to a plurality of patents which disclose various molecular weight copolymers of maleic anhydride and monoethylenic compounds for the treatment of water to prevent calcium and magnesium deposits. U.S. Pat. No. 3,715,307 discloses copolymers of maleic anhydride and butylene for use in heat transfer equipment. Copolymers of maleic anhydride and diisobutylene are also disclosed in U.S. Pat. No. 2,930,775 for dispersing calcium hydroxide in an aqueous pigment medium. Finally, the use of maleic anhydride copolymers for controlling scale and dispersing suspended matter particularly in cooling water systems is discussed in the publication entitled "Drew Principles of Industrial Water Treatment", pp. 80-84, as is the theory of disrupting the lattice structure of such scale crystals. These various disclosures, however, all relate to processes conducted in entirely different environments from the FGD system of the instant invention and involve different scale forming salts in different aqueous media. Moreover, none of the referred to disclosures provides any suggestion that the particular copolymer disclose herein would be as effective in an FGD environment as has been surprisingly discovered.

DESCRIPTION OF THE PREFERRED EMBODIMENT

Figure 1:
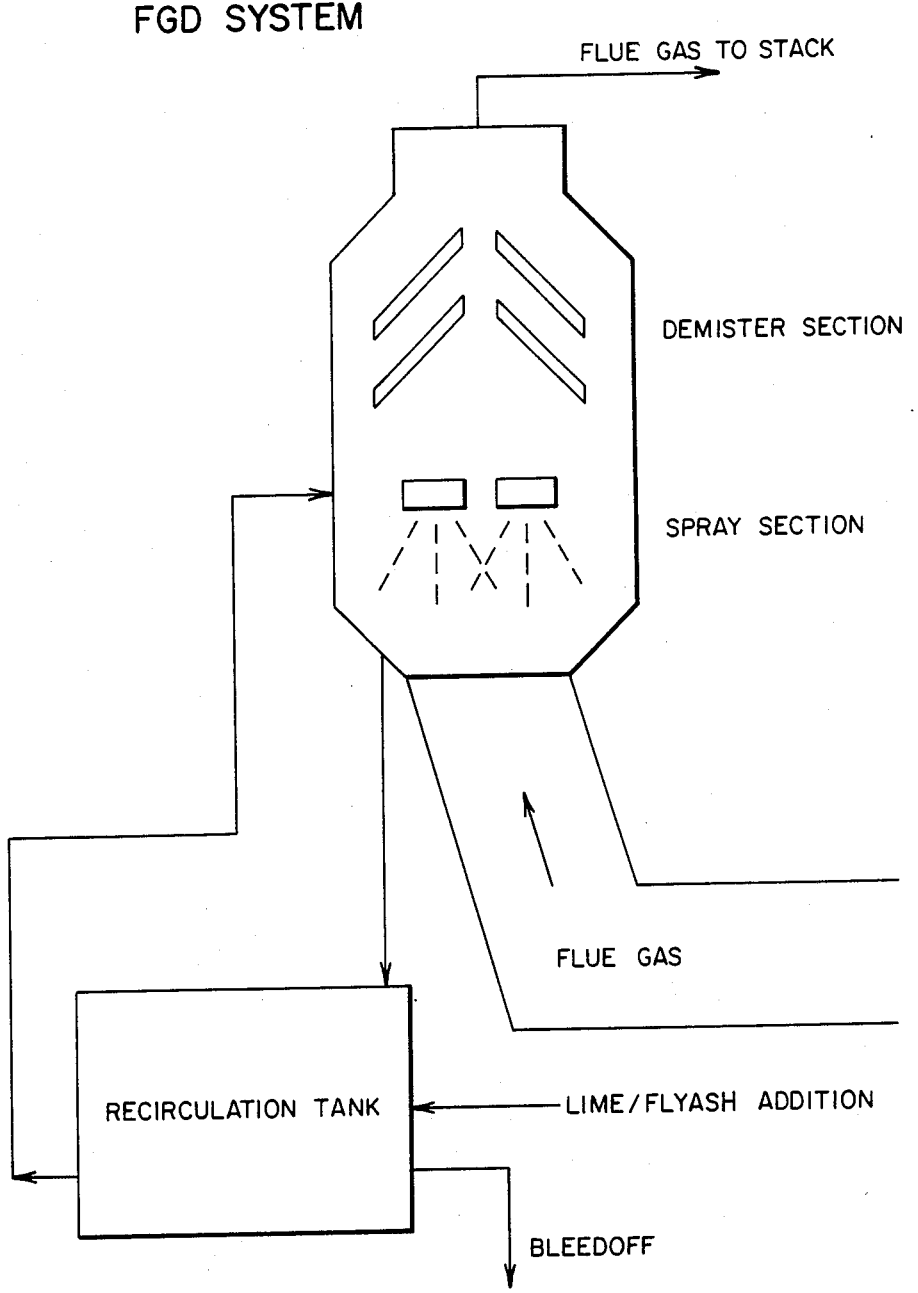
FIG. 1 of the drawings is a simplified schematic diagram illustrating a typical FGD system normally employed for the desulfurization of flue gases before discharge through the stack to the atmosphere.

Referring to FIG. 1 of the drawing, there is shown a typical FGD system comprising a flue gas treating unit having spray and demister sections into the bottom of which is fed the flue gas to be treated and from the top of which is withdrawn the desulfurized flue gas which is then discharged to the atmosphere through a stack. Calcium-bearing slurry liquor prepared from lime, limestone or flyash, or a combination of these, in a conventional 5–25% concentration is introduced into the spray section of the unit in countercurrent flow to the flue gas, and withdrawn from the bottom thereof to be recirculated through a recirculation tank. Continuous or periodic bleedoff of slurry is made at the recirculation tank and slurry makeup added to keep the volume and concentration of the slurry substantially constant.

As described hereinabove, the polymeric additive in accordance with this invention is 50:50 diisobutylene-maleic anhydride copolymer of an average molecular weight of 11000. The copolymer additive is preferably used in the form of an aqueous dispersion or solution of a solids concentration that may vary considerably but which will usually range for ease of handling from about 10–15%, e.g., 12.5%. The polymeric solution is introduced into the system in an amount that may range widely depending on the FGD system operating pH, the solids content of the slurry and the design of the particular FGD system, but will usually be introduced so as to provide about 0.1–25 parts of active polymer, preferably 5.0–10 parts, per million parts of slurry liquor. Continuous or periodic addition of the aqueous polmeric additive solution is made to the FGD system to compensate for that withdrawn with the slurry bleedoff. Addition of the polymeric additive may be made to the recirculation tank but can just as readily be made to the makeup water line, the calcium slurry addition line or the spray water recirculation loop.

The following example further illustrates the method according to the present invention.

EXAMPLE 1

An electric ultility was experiencing severe calcium scale deposits in its FGD system requiring equipment shut down approximately every 30–45 days for manual cleaning of the demister and packed sections of the system. The FGD system was a countercurrent closed recirculating type system, similar to that schematically illustrated in FIG. 1 of the drawing, with a slurry volume of approximately 300,000 gallons. Lime and fly ash in the form of an aqueous slurry were used for sulfur dioxide removal. The composition of the coal from which the flue gas was generated and the make up of the FGD system were as follows:

| Coal (Lignite) | | FGD System | |
|---|---|---|---|
| Sulfur* | 0.55–.70% | Vol. | 300,000 gal. |
| Ash* | 9.0–10.0% | Bleedoff | 300 gpm |
| Quantity* | 17,500–19,000 tons | Calcium Solids Av. | 14% |
| | | pH | 6.0–7.5 |
| | | SO$_2$ Removed | 80–90% |

*Daily average

The 50:50 diisobutylene-maleic anhydride copolymer of an average molecular weight was fed as a 12.5% aqueous solution to the recirculation tank at the rate of 50 ppm, i.e., 6.25 ppm active polymer content, with continuous bleedoff and makeup slurry addition to maintain the volume and concentration. After approximately 6 months of operation, the FGD system was shut down and found to be significantly more free of calcium scale on its internal surfaces than had heretofore been experienced even after a much shorter operating period of 30–45 days. The duct work of the system was virtually clean and only minor deposits of scale were evident in the demister section. Deposits formed in the system with and without the presence of the additive were both found to have the following analysis indicating that the chemical composition of the deposits taken both before and after treatment remained essentially the same.

Calcium as CaO: 22–24%

Silicon as SiO$_2$: 16–18%

Sulfur as SO$_3$: 32–34%

Loss on ignition: 21.3–27%

Figure 2:
FIG. 2 shows photographs of calcium sulfite/calcium sulfate deposits taken from an FGD system both before treatment and after treatment according to the present invention.
Figure 2:
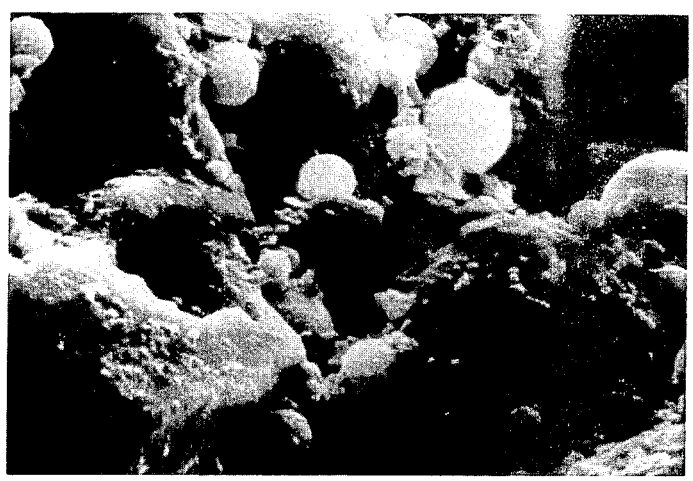

FIG. 2 of the drawings shows photographs comparing deposits formed in the FGD system of Example 1 both in the presence and absence of the additive of this invention. The deposits formed in the absence of the additive were found to be brittle and hard, adhered firmly to the surfaces of the FGD system and were difficult to dislodge. The deposits formed in the presence of the additive of this invention, on the other hand, were soft and lacked any physical strength. There was substantially less adherence of deposits to the surfaces of the system as compared to deposits formed in the absence of the additive, and such adherence as there was, was much more easily dislodged.

We claim:

1. In a flue gas desulfurization system in which sulfur dioxide-containing flue gas is passed in countercurrent flow with an aqueous calcium-bearing scrubbing liquor whereby the sulfur dioxide is removed from said flue gas by being absorbed by said scrubbing liquor and converted to calcium sulfite and/or calcim sulfate, the improvement of minimizing the formation of calcium scale on the surfaces of the system which comprises maintaining in said scrubbing liquor about 0.1–25 ppm of a 1:1 diisobutylene-maleic anhydride copolymer having an average molecular weight of 11000, said copolymer being incorporated in said scrubbing liquor as a 10–15% aqueous dispersion.

2. The improvement according to claim 1 in which the concentration of said copolymer in said scrubbing liquor is 5–10 ppm.

* * * * *